(12) United States Patent
Singh

(10) Patent No.: US 11,100,493 B2
(45) Date of Patent: Aug. 24, 2021

(54) PHYSICAL CARD ENABLING UTILIZATION BASED ON LOCATION

(71) Applicant: PayPal, Inc., San Jose, CA (US)

(72) Inventor: Ravi Raj Singh, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 67 days.

(21) Appl. No.: 16/714,648

(22) Filed: Dec. 13, 2019

(65) Prior Publication Data

US 2021/0182833 A1 Jun. 17, 2021

(51) Int. Cl.
*G06Q 20/34* (2012.01)
*G06K 19/07* (2006.01)
*G06K 19/073* (2006.01)

(52) U.S. Cl.
CPC .......... *G06Q 20/352* (2013.01); *G06K 19/07* (2013.01); *G06K 19/071* (2013.01); *G06K 19/0701* (2013.01); *G06K 19/073* (2013.01); *G06K 19/07309* (2013.01); *G06Q 20/341* (2013.01)

(58) Field of Classification Search
CPC ............... G06Q 20/352; G06Q 20/341; G06K 19/07309; G06K 19/073; G06K 19/0701; G06K 19/071; G06K 19/07
See application file for complete search history.

(56) References Cited

U.S. PATENT DOCUMENTS

| | | | |
|---|---|---|---|
| 6,791,398 B1* | 9/2004 | Lin .................... | G06K 19/0701 327/517 |
| 7,533,408 B1* | 5/2009 | Arnouse .................. | G06F 1/16 726/9 |
| 7,588,180 B1* | 9/2009 | Carmichael ........ | G06K 7/10079 235/379 |
| 9,959,540 B2* | 5/2018 | Todasco ............. | G06Q 20/3224 |
| 2011/0131128 A1* | 6/2011 | Vaananen ............. | G07F 7/1008 705/37 |

* cited by examiner

*Primary Examiner* — Seung H Lee
(74) *Attorney, Agent, or Firm* — Haynes and Boone, LLP

(57) ABSTRACT

There are provided systems and methods for a physical card having one or more location detection modules for location-specific card reading. A physical payment card may include one or more components to limit card reading of card data stored to the card using a location detection chip. The location detection chip may receive power from a source when inserted to a card reader, and may then determine a location of the card, such as a coordinate location of the card or nearby detected device. The location detection chip may determine if this location or device matches authorized locations stored in a memory of the card. If it does, power may be provided to a card chip of the card. The card chip of the card reads card data from a memory of the card and may then output the card data to the card reader.

20 Claims, 5 Drawing Sheets

PHYSICAL CARD ENABLING UTILIZATION BASED ON LOCATION

TECHNICAL FIELD

The present application generally relates to physical cards having stored card data, and more particularly to location-specific physical cards for limited card reading at authorized locations.

BACKGROUND

Physical "cards" or other small objects may be utilized to store data, such as magnetic stripes or EMV chips on credit, debit, or identification cards, as well as radio frequency identification (RFID) token or fob devices. These cards and other objects may be scanned by readers to obtain the data on these objects, which may be utilized to pay for purchases, identify a user, or perform another process. However, physical cards are increasingly a concern for risk and fraud. Fraudsters may steal not only the physical representation of the card but may also use "skimmers" or other devices that may read the card data when the card is inserted to a machine, which allows the fraudster to copy or clone the card. Moreover, employers that wish to provide certain cards to their employees may be reluctant to do so where the card does not have increased protection from misuse. Risk analysis teams for card issuers may review where and when a card was scanned or used, but this measure only prevents fraud after the card has been scanned. Moreover, where the card may be utilized within a similar geo-location, the fraud may go unnoticed by those card issuers.

Figure 1:
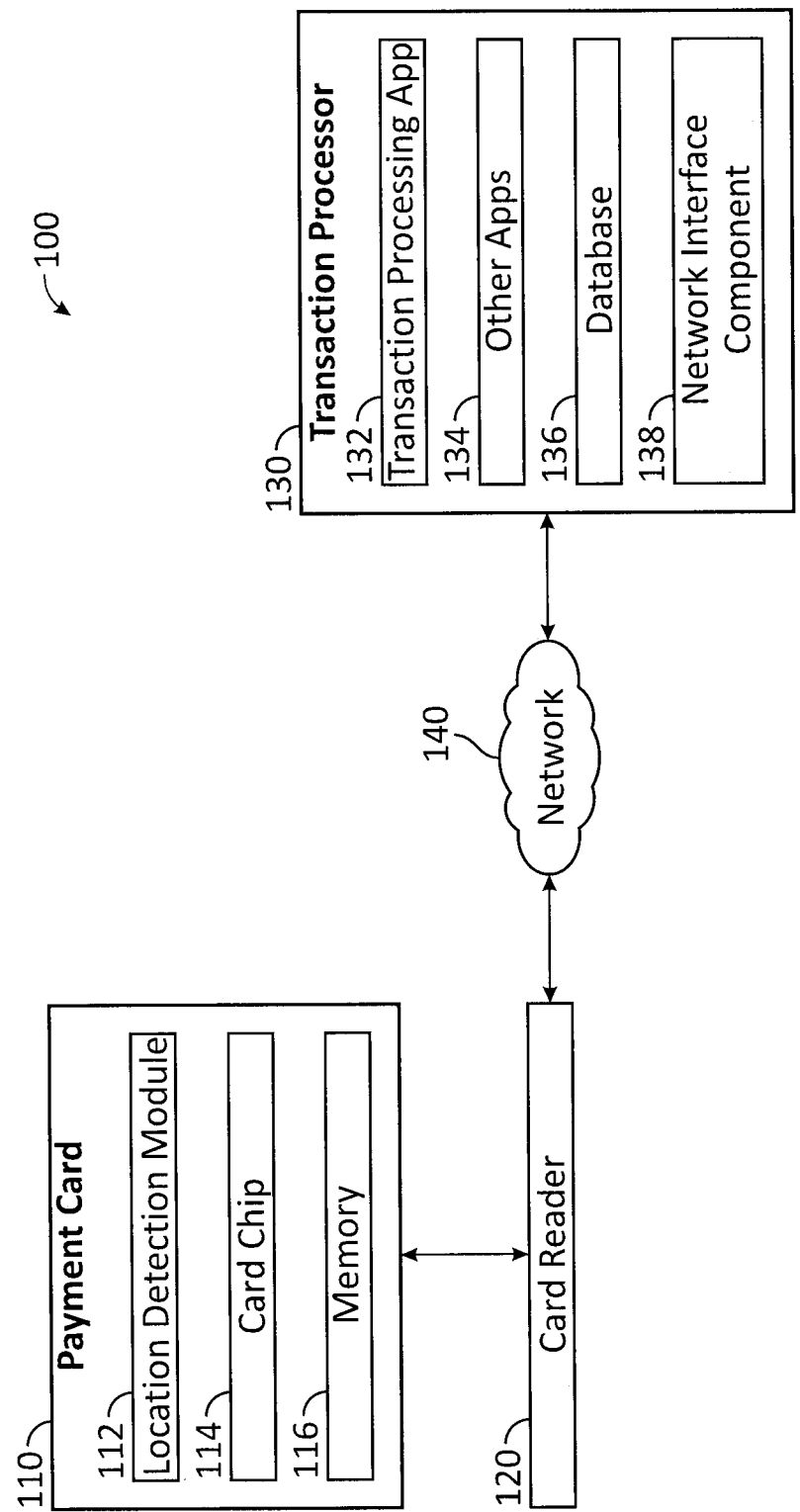
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a physical card having one or more location detection modules for location-specific card reading. Systems suitable for practicing methods of the present disclosure are also provided.

A physical card may be limited to being read and used at specific locations based on an on-card location detection module or component, such as a Global Positioning Satellite (GPS) or other Global Navigation Satellite System (GNSS) processor chip that can detect a location of the physical card. The physical card may correspond to a payment card (e.g., credit, debit, or gift card that may be linked to stored funds or an account), an identification card, an access card, or other readable card that stores data. This stored data may include funding source details, such as an account number, authorization data or token, stored funds identification, user identification, authorization details, and the like. Generally, physical data cards are readable by card readers through connection to the card readers (e.g., either physically or wirelessly within a range), which allows for receipt and use of the card data by the reader. These readers may be coupled to point-of-sale (POS) or merchant devices that further interact with one or more backend card processors and/or use the data by the device. These physical data cards may include an EMV chip, magnetic stripe, RFID chip, USB or Micro-USB connector, SD or Micro-SD chip, or the like that allows for data reading by a card reader at a location. However, to prevent unauthorized uses of the payment card, such as by reading the card data at unauthorized locations (e.g., when a card has been stolen by a fraudster or utilized by a user for unauthorized purchases), access to the card data may be limited so as to be read only during authorized scenarios and locations. For example, a workplace, employer, supervisor, or other user or entity may wish to provide a payment card to employees of the organization. However, that supervising entity may wish to limit the card to only being used at authorized restaurants or authorized suppliers (e.g., workplace supply companies) so that employees don't spend funds on unauthorized items.

Thus, in order to limit reading of physical cards by unauthorized card readers, such as those located at unauthorized locations for card reading and use, the card may include a location detection module or chip, including a GPS chip, that is configured to only allow the card to be read when the location detection chip detects that a location of the card is at an authorized location approved for card reading and use of the stored data on the card with the card reader and/or connected devices/servers. The location detection chip includes an authorization module (e.g., a module having a microprocessor, logic device, or other processor that may be coupled to a memory) and a location detection component or detector (e.g., GPS detector), where the location detection component is configured to determine the physical location of the card. The location detection component may determine the location of the card by querying a server, satellite, or other network device for the current location or detecting the location using such components and/or networks. This may correspond to a passive chip that requires power from an external power connector and supply to detect the location. The authorization module of the location detection chip is further connected or coupled to a memory, where the memory stores authorized location data. The authorized location data may correspond to latitude, longitude, or other GPS coordinates, and may correspond to specific coordinates, generalized coordinates, and/or geo-fenced areas for sets of coordinates. The authorized location data may also include names or identifiers of authorized locations. The authorized locations may be a single location or multiple locations. The authorization module may execute one or more operations (e.g., using the microprocessor, logic device, or other processor) to determine if the detected location data matches the stored location data in the memory.

In other embodiments, different types of location detection chips may be used. For example, rather than utilized a GPS component as described above, the location detection chip may correspond to a communication module that is capable of connecting with other nearby transceivers to request a location, receive an identifier, or request data identifying the transceiver and/or location. For example, a passive Bluetooth, Bluetooth Low Energy (BLE), RFID, or other antenna or receiver may be activated by receiving power and thereafter send or receive data. Similarly, an authorization module, in this embodiment, may include authorization information, such as information that includes authorized identifiers of locations or transceivers. Thus, the location detection component may utilize the communication module to receive identifiers, location data, or other data being broadcast by one or more nearby transceivers, and further the authorization module of the location detection component may compare the received location information to the information stored in memory to determine whether the card is authorized to be used in the specific location. In other embodiments, a biometric module may also be used to only allow certain users to utilize the payment card where the payment card may be distributed or passed between users. For example, a fingerprint scanner may correspond to the mechanism to limit the use of the payment card.

When using a physical card (e.g., a payment or identification card), the card is inserted into a card reader. In order to activate the card and provide location-specific card reading of the physical card, the card includes one or more power connections, components, or other connectors that provide power to the processors, chips and other components of the card. The physical card may not include a separate power supply, such as a battery or rechargeable power source. Thus, a power connector of the card may serve to provide the card with power from an external power supply, such as an induction power source (e.g., through magnetic field emissions) or a direct electrical connection. Where two or more power connectors may be used, one or more of those may be used to directly provide power to the location detection chip for use in detecting whether a location of the card is an authorized location. One or more other ones of the power connectors (e.g., those other ones not directly connected to the location detection chip) may then be connected to a gate or other signal and/or power gateway, such as a diode or transistor. This gate may block, allow, or otherwise "gate" power to a card chip of the card that is associated with a memory storing the card's data (e.g., payment or financial data, authorization or authentication information, etc.). The gate may provide power to the card chip based on a signal received from the location detection chip, such as a signal from the location detection chip based on detection of the card at an authorized location or power sent through the location detection chip based on detection at the authorized location. For example, the gate may correspond to an AND gate, diode, or transistor (e.g., one having a logical conjunction decision-making component) where power from one connector and a signal or power from the location detection chip may both be required for the gate to transmit power to the card chip for the card's memory (e.g., by allowing power to flow through to the card chip) so the card chip can read the card's data from the memory and output that data.

In some embodiments, a single power connector may instead be used that provides power directly to the location detection chip to activate and power the location detection chip for location detection, wireless communications, and processing at authorized locations. For example, a separate gate may not be required if signal and/or power is received from separate connectors, where one connector is associated with the location detection chip. In such embodiments, the location detection chip serves as the gate and allows power to flow through to the card's logic device for reading of the memory if the location detection chip detects that the location of the card is an authorized location. Thus, the card may include a gate connected to multiple power connections through the external power supply (e.g., two connectors, where one is connected to the location detection component that only provides power or a signal to the gate based on a detected authorized location) or a single connector that connects to the location detection chip and the card chip, where the location detection chip allows power to flow to the card chip based on detecting an authorized location of the card.

Thereafter, if power is allowed to flow to the card chip by the gate and/or location detection chip, the card chip may receive the power and activate to perform one or more operations. The card chip on the card may correspond to a logic device (e.g., processing device, microcontroller, processor, application specific integrated circuit (ASIC), field programmable gate array (FPGA), memory storage device, memory reader, or other device or combinations of devices), which may be configured to read the same or a different memory of the card for the card-specific data. This card-specific data may correspond to payment or financial data stored on the card and used to process transactions. The card-specific data may also include other types of data, such as access, identification, authorization, or authentication data used with other types of processes. The card chip then retrieves the card data from the memory for use with the reader.

The card that is inserted to or otherwise read by the reader includes one or more output components configured to output the card data and/or make the card data readable for reading and receipt by the card reader. The output component may correspond to an EMV chip, a programmable magnetic card strip, a RFID antenna, a USB or Micro-USB connector, an SD or Micro-SD chip, or other component that allows for transmission of the card data to the reader. This data is output in response to the location detection chip of the card detecting that the card is at an authorized location, and therefore is only output by the card chip and card based on detecting the authorized location. The reader may then receive the card data and may process the card data, which may utilize a POS or other merchant device, a network, and/or a backend card processor. Thus, the card only provides card data in response to being located at an authorized location and prevents fraud or misuse of physical cards by fraudsters or other users for unintended purposes. This provides more controlled data output and serves to minimize abuse associated with these cards.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a payment card 110, a card reader 120, and a transaction processor 130 in communication over a network 140. Payment card 110 may be utilized by a user to perform one or more operations requiring data on the payment card, such as providing a payment for transaction processing at a location. Payment card 110 may be configured to determine if the location is an authorized location. If so, payment card 110 may allow the card data to be read by card reader 120. Card reader 120 may then interact with transaction processor over network 140 to complete the data processing based on the provided card data. Note that payment card 110 does not have to be used for payments. It can include any type of data or correspond to any type of card used to provide sensitive data, e.g., data that is not publicly available. For example, payment card 110 can correspond to an identification card, an insurance card, an access card, a rewards or loyalty card, and the like. As such, data contained in payment card 110 may include account numbers, access codes, personal identification data, and the like.

Payment card 110, card reader 120, and transaction processor 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Payment card 110 may be implemented as a physical card or device that provides card data stored to payment card 110 in response to meeting one or more conditions, such as detection of payment card 110 at an authorized location. Although only one card is shown, a plurality of cards may function similarly and/or be connected to provide the functionalities described herein. Payment card 110 of FIG. 1 contains a location detection module 112, a processor 114, and a memory 116. Payment card 110 may include executable processes, procedures, and/or applications with associated hardware. In other embodiments, payment card 110 may include additional or different modules having specialized hardware and/or software as required.

Location detection module 112 may correspond to one or more software modules and associated hardware components of payment card 110 to detect a location of payment card 110, and determine if the location is an authorized location. In this regard, location detection module 112 may correspond to specialized hardware and/or software to receive power from a power connector of payment card 110 that connects to an external power source, such as an induction coil or electrical connection. Location detection module 112 may determine whether payment card 110 is located at an authorized location by determining or receiving location information, such as GPS coordinates or a broadcast identifier by a nearby wireless transceiver and match that data to authorized location-based data stored in memory 116. Thus, memory 116 may correspond to one or more physical non-transitory memories that stores authorized location data for payment card 110, such as coordinates for allowed locations of use of payment card 110, geo-fences for those locations, and/or identifiers for transceivers broadcasting those identifiers at allowed locations. If the location is an authorized location where use of payment card 110 is allowed, location detection module 112 may send a signal or power to processor 114. In some embodiments, payment card 110 further includes one or more power connectors and/or gates that may correspond to a logic device, such as one having an AND logical conjunction gate through a diode or transceiver.

Once processor 114 receives power from location detection module 112 and/or the gate that allows power to pass based on fulfilling a logical condition, processor 114 may read or access memory 116 to receive the card data. The card data may correspond to credit card data, bank account data, or other funding source data, as a payment instrument when providing payment information including digital wallet data associated with an account with a payment provider, such as transaction processor 130. This may include a digital token identifying the account and/or digital wallet. Memory 116 may also or instead store other data, including authentication, authorization, identification, or other card data specifically associated with payment card 110. In some embodiments, memory 114 may correspond to a plurality of separate memories, where different independent physical non-transitory memories store the authorized location data and the card data. Once the card data is retrieved based on the provided power to processor 114, processor 114 may then output the card data to card reader 120.

Card reader 120 may be implemented using any appropriate hardware and software configured for wired and/or wireless communication with payment card 110, and/or transaction processor 130 for processing card data provided by payment card 110 when payment card 110 detects that it is located at an authorized location. Card reader 120 may correspond to a point-of-sale (POS) device or other physical merchant device that allows input of payment card 110, including connectable, attachable, or wireless card readers that may be in communication with the physical merchant device. In various embodiments, card reader 120 may be implemented as a personal computer (PC), a smart phone, laptop/tablet computer, wristwatch with appropriate computer hardware resources, other type of wearable computing device, and/or other types of computing devices capable of transmitting and/or receiving data. Although only one reader is shown, a plurality of readers may function similarly.

In some embodiments, card reader 120 and/or the connected device may receive transaction data for a transaction to be processed using payment card data stored to payment card 110. Once the items have been finalized for purchase by the user, a total may be calculated, and a transaction may be engaged with the user of payment card 110 to complete payment for the selected items, for example, through card data or other information from payment card 110. Payment card 110 may be inserted to or used with card reader 120, where card reader 120 reads the card data from payment card 110 when provided by payment card 110. This may occur (e.g., payment card 110 may make the card data available for reading) when payment card 110 detects that it is located at an authorized location. Thus, the merchant may request and receive payment covering the selected items from the user from payment card 110. Card reader 120 or the associated device may then communicate with transaction processor 130 to process the transaction. Card reader 120 and/or the associated device may alert the merchant when payment for the transaction for the item(s) is completed and may provide a transaction history to the user and/or the associated device for generating a receipt to the user associated with payment card 110. Card reader 120 may include a power supply or source that provides power to payment card 110 through power connections of payment card 110 with location detection chips and processors of payment card 110. Card reader 120 may also correspond to other readers configured to process the card data from payment card 110, such as access card readers, identity card readers, and the like. In such embodiments, card reader 120 may be a standalone device or a device connected to another processor that may authorize and/or use the data from payment card 110 to provide access, identity confirmation, or other process or service.

Transaction processor 130 may be maintained, for example, by an online service provider, which may provide transaction processing services for transactions for items using card data from payment card 110, which may be read by card reader 120 when payment card 110 detects a location of payment card 110 when used with card reader 120 and determines that location is an authorized location. In this regard, transaction processor 130 includes one or more processing applications which may be configured to interact with payment card 110, card reader 120, and/or another device/server to facilitate communications and transactions between users and merchants using payment card 110. In one example, transaction processor 130 may be provided by PAYPAL®, Inc. of San Jose, Calif., USA. However, in other embodiments, transaction processor 130 may be maintained by or include another type of service provider.

Transaction processor 130 of FIG. 1 includes a transaction processing application 132, other applications 134, a database 136, and a network interface component 138. Transaction processing application 132, and other applications 134 may correspond to executable processes, procedures, and/or applications with associated hardware. In other embodiments, transaction processor 130 may include additional or different modules having specialized hardware and/or software as required.

Transaction processing application 132 may correspond to one or more processes to execute modules and associated specialized hardware of transaction processor 130 to process a transaction for item(s) with card reader 120, which may be based on reading card data from payment card 110. In this regard, transaction processing application 132 may correspond to specialized hardware and/or software used by a user associated with payment card 110 to establish a payment account with transaction processing application 132 by providing personal and/or financial information to transaction processor 130 and selecting authentication credentials. In various embodiments, the financial information may include payment instrument information, such as account/card numbers and information. The account may be used to send and receive payments. The payment account may be accessed and/or used through a browser application and/or dedicated payment application. Additionally, the account and/or a digital wallet established by the user may be linked to payment card 110, for example, by storing data necessary to perform transaction processing with payment card 110. Transaction processing application 132 may further store data for authorized locations for payment card 110, which may be set by an owner, supervisor, or other entity that controls payment card 110 and may use or provide payment card 110 for use by others in one or more transactions. Thus, transaction processing application 132 may be used to establish, setup, and issue payment card 110 to one or more users.

Once a transaction is generated and card data is read from payment card 110, transaction processing application 132 may be used to process a transaction based on the transaction data and the card data from payment card 110. Transaction processing application 132 may receive the transaction data and the card data and may process the transaction by issuing a payment to the account of the merchant associated with card reader 120. Transaction processing application 132 may therefore receive a payment request from card reader 120 for the transaction data, which may include identifiers, tokens, or other data used for transaction processing by identifying an account of payment card 110 used to transfer funds to an account associated with card reader 120. In some embodiments, transaction processing application 132 may further provide fraud detection services associated with payment card 110. For example, payment card 110 may detect that it is located at a valid location based on authorized location data stored to payment card 110. However, payment card 110 (or another card) may correspond to a cloned card that fraudulently obtains and utilizes the data for payment card 110. In such embodiments, payment card 110 may be scanned at a first location and a second location. Based on the timestamps of the scans, distance between the first and second locations, and other risk data, one or more of the transactions may be refused as indicating fraud. For example, the second location may be located a significant distance from the first location, where the two scans are within a short time, indicating fraud as payment card 110 would be unlikely to be located at both those locations over that time period. However, if the transaction is valid, transaction processing application 132 may process a payment and may provide a transaction history to the account associated with payment card 110 and/or card reader 120, as well as direct data for output on card reader 120, for transaction authorization, approval, or denial.

In various embodiments, transaction processor 130 includes other applications 134 as may be desired in particular embodiments to provide features to transaction processor 130. For example, other applications 134 may include security applications for implementing server-side security features, programmatic client applications for interfacing with appropriate application programming interfaces (APIs) over network 140, or other types of applications. Other applications 134 may contain software programs, executable by a processor, including a graphical user interface (GUI), configured to provide an interface to the user when accessing transaction processor 130, where the user or other users may interact with the GUI to more easily view and communicate information. In various embodiments, other applications 134 may include additional connection and/or communication applications, which may be utilized to communicate information to over network 140.

Additionally, transaction processor 130 includes database 136. Database 136 may store various identifiers associated with payment card 110. Database 136 may also store account data, including payment instruments and authentication credentials, as well as transaction processing histories and data for processed transactions. Database 136 may store received data associated with a user, such as tracked data of the user so that correlations between locations and activities may be generated. In some embodiments, one or more authorized locations for payment card 110 may be stored to database 136. Additionally, database 136 may store transaction data provided when payment card 110 is used.

In various embodiments, transaction processor 130 includes at least one network interface component 138 adapted to communicate with payment card 110, card reader 120, and/or another device/server for a merchant over network 140. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
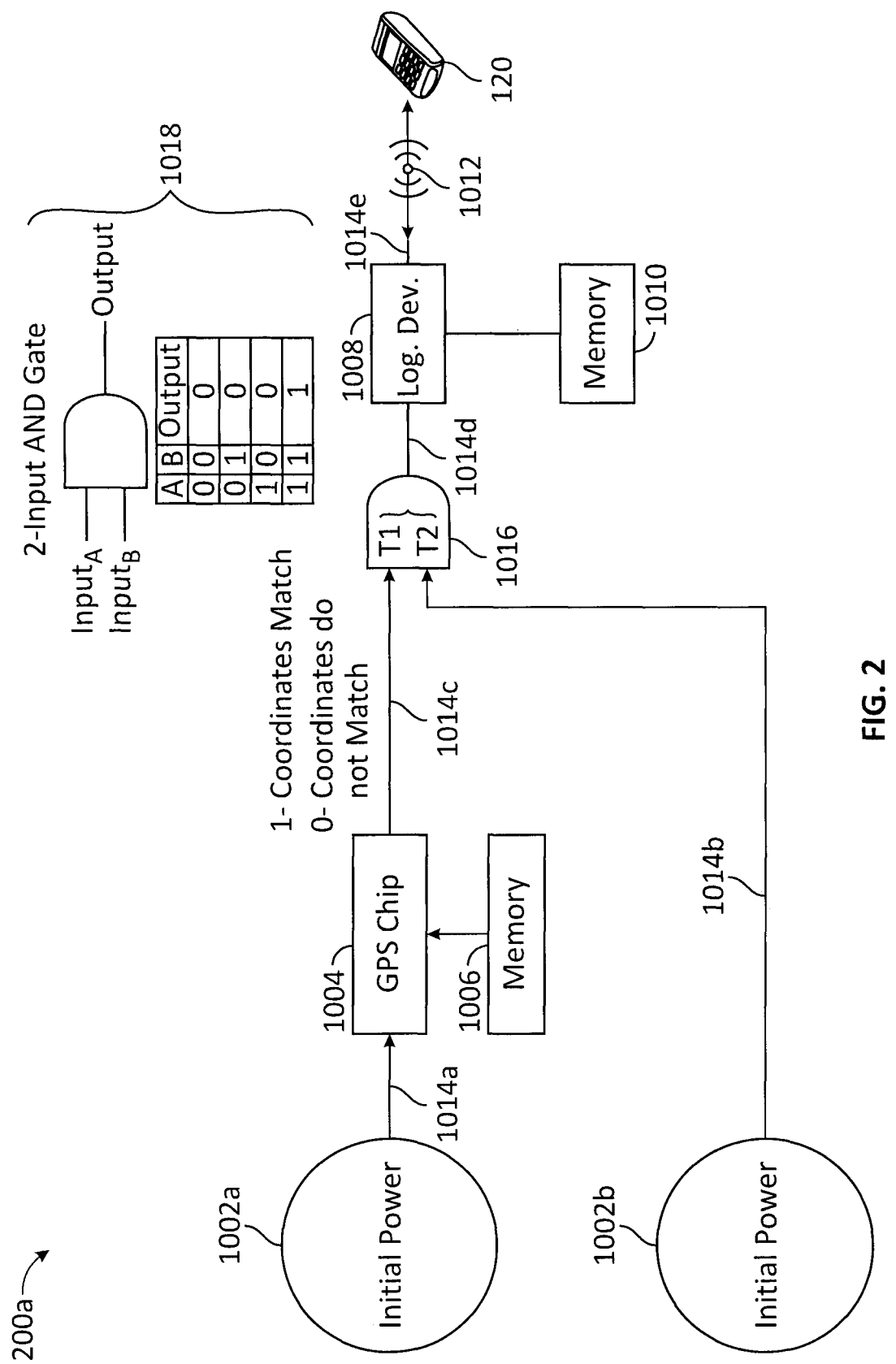
FIG. 2 is an exemplary block diagram of a payment card having two power connections that provides payment card data based on a detected location, according to an embodiment.

FIG. 2A is an exemplary block diagram of a payment card having two power connections that provides payment card data based on a detected authorized location, according to an embodiment. In this regard, system 200*a* includes a payment card 110 discussed in reference to system 100 of FIG. 1 and shows an exemplary card including two power connections used to transmit power to a processor for card reading output.

For example, system 200*a* includes a payment card 1000 having two power connections to an external power supply, such as an induction or electric power source, shown as a power point 1002*a* and a power point 1002*b*, which may form conductive points to receive or generate power through the electrical or magnetic power source. Although two power points are shows that connected to the external power source to generate and/or receive electrical power for payment card 1000, a single power point may also be utilized or multiple additional power points. For example, power point 1002*a* and power point 1002*b* may be the same or multiple different power points that provide electrical power from an external point to payment card 1000.

Power point 1002*a* forms a connection to a GPS chip 1004 through a connection 1014*a* while power point 1002*b* forms a connection directly to a gate 1016 through a connection 1014*b*. GPS chip 1004 corresponds to a location detection module that may limit the reading of card data from payment card 110 by detecting location-specific data for a current location of payment card 110 when power is received from power point 1002*a* via connection 1014*a*. When GPS chip 1004 receives power, it activates and/or executes a process to detect a current location of payment card 110. This may be done utilizing a GPS network or other location detection system to detect coordinates, identifiers, or other information for a current geo-location of payment card 110. However, other modules may also be utilized, including short range communication antennas and transceivers configured to receive a locally broadcast identifier by a nearby device. GPS chip 1004 then reads memory 1006 storing coordinates for enabled geo-locations or other location-specific data, such as identifiers for the location or nearby devices.

If a match between the detected data by GPS chip 1004 occurs with the stored data in memory 1006, GPS chip 1004 may issue a signal or provide power via a connection 1014*c* to gate 1016. As shown in system 200*a*, when coordinates match, a signal or power provides a binary 1 signal from GPS chip 1004 to gate 1016, where this signal or power provides information or a biasing signal to gate 1016 when payment card 110 is located at a valid and authorized location, which is input to a first input of gate 1016. However, if a match is not determined from the detected data to the stored data, then gate 1016 detects a binary 0 signal, which corresponds to the lack of the match. Moreover, when power point 1002*b* receives power from the external source or supply, a signal or power is provided directly to gate 1016 via connection 1014*b*, where gate 1016 then detects a binary 1 signal at a second input of gate 1016. Chart 1018 shows the output of gate 1016 based on the received signals and/or power at the two inputs to gate 1016. For example, where a binary 0 is received at one or both of the inputs, gate 1016 provides no output power (e.g., acts as a Boolean AND logical switch). However, where GPS chip 1004 detects a match and an authorized location, and power is further detected and provided at connector 1002*b*, then gate 1016 provides an output signal and/or power indicating a match and therefore allows use of payment card 110 by enabling data to be read from payment card 110.

Thereafter, gate 1016 provides power through a connection 1014*d* to a processor 1008 of payment card 110. Processor 1008 may correspond to a power-up processor that activates when receiving power or signaling from gate 1016. Processor 1008 is connected to a memory 1010 (e.g., one or more physical non-transitory memories, such as magnetic tape, any other magnetic medium, any other optical medium, RAM, PROM, EEPROM, FLASH-EEPROM, any other memory chip) that stores card data for payment card 110 that is usable by card reader 120, such as to process a transaction. In some embodiments, memory 1010 may be the same memory as memory 1006 and both authorized location data and card data may be stored to a single memory on payment card 110. Processor 1008 may then read the card data from memory 1010 and may output the card data via connection 1014*e* to an output 1012 that can be read by card reader 120. Output 1012 may correspond to various types of data output mechanisms, including programmable magnetic card stripes, NFC or RFID components, and other types of output ports or mechanisms.

System 200*a* may also include a payment card 110 discussed in reference to system 100 of FIG. 1 that shows an exemplary card including one power connection used to transmit power to a processor for card reading output.

For example, power point 1002*a* is shown in system 200*a*'s payment card 110 that may correspond to an induction coil for receiving power via induction and magnetic fields or through a direct electric connection. This power may be received when payment card 110 is entered into, tapped, or otherwise engaged with a card reader for reading data stored to the card, such as payment card data necessary to process a transaction. However, in order to limit the reading of the card data to certain locations, payment card 110 includes connections 1014*a-e* that provide a connection to transmit power and/or signals from power point 1002*a* (received from the external source or supply) to a GPS chip 1004, a processor 1008, and an output 1012 only when payment card is at those certain locations. For example, connection 1014*a* serves to provide power directly from power point 1002*a* to GPS chip 1004, which activates GPS chip 1004 and allows GPS chip 1004 to determine a location of payment card 110 using a GPS system and detector. GPS chip 1004 may correspond to a passive chip that interacts with a GPS coordinate detection system to detect GPS coordinates and the like. However, other location detection chips or components may also be used, including wireless transceivers that receive identifiers for nearby wireless transceivers.

Once powered and a location is determined, GPS chip 1004 may then read memory 1006 to determine if the location matches an authorized location and/or identifier. If no match is found, then GPS chip 1004 may not provide power or a signal to processor 1008 as payment card 110 is not located at an authorized location. However, if the location, identifier, or other detected data is found in and/or matches data from memory 1006, the GPS chip 1004 may provide the power or signal to processor 1008 via connection 1014c/d, which activates processor 1008. Processor 1008 may correspond to a logic device on payment card 110 that may read memory 1010 when it receives the signal or power and retrieves data stored to memory 1010. The data stored to memory 1010 may correspond to a card data specific to payment card 110, which may include payment card, account, gift balance, authentication, access, authorization, and/or identification data. In some embodiments, memory 1006 may by the same memory as memory 1010 and store both the authorized location or identifier data for payment card 110 and the card data for processor 1008, and may be physical non-transitory memories, such as magnetic tape, any other magnetic medium, any other optical medium, RAM, PROM, EEPROM, FLASH-EEPROM, any other memory chip. Once the card data is read from memory 1010, processor 1008 may output the card data through output 1012 via connection 1014e, where the output 1012 may correspond to a data connection for reading and transmitting data. Thereafter, output 1012 may be read by card reader 120, which may then process the card data.

Figure 3:
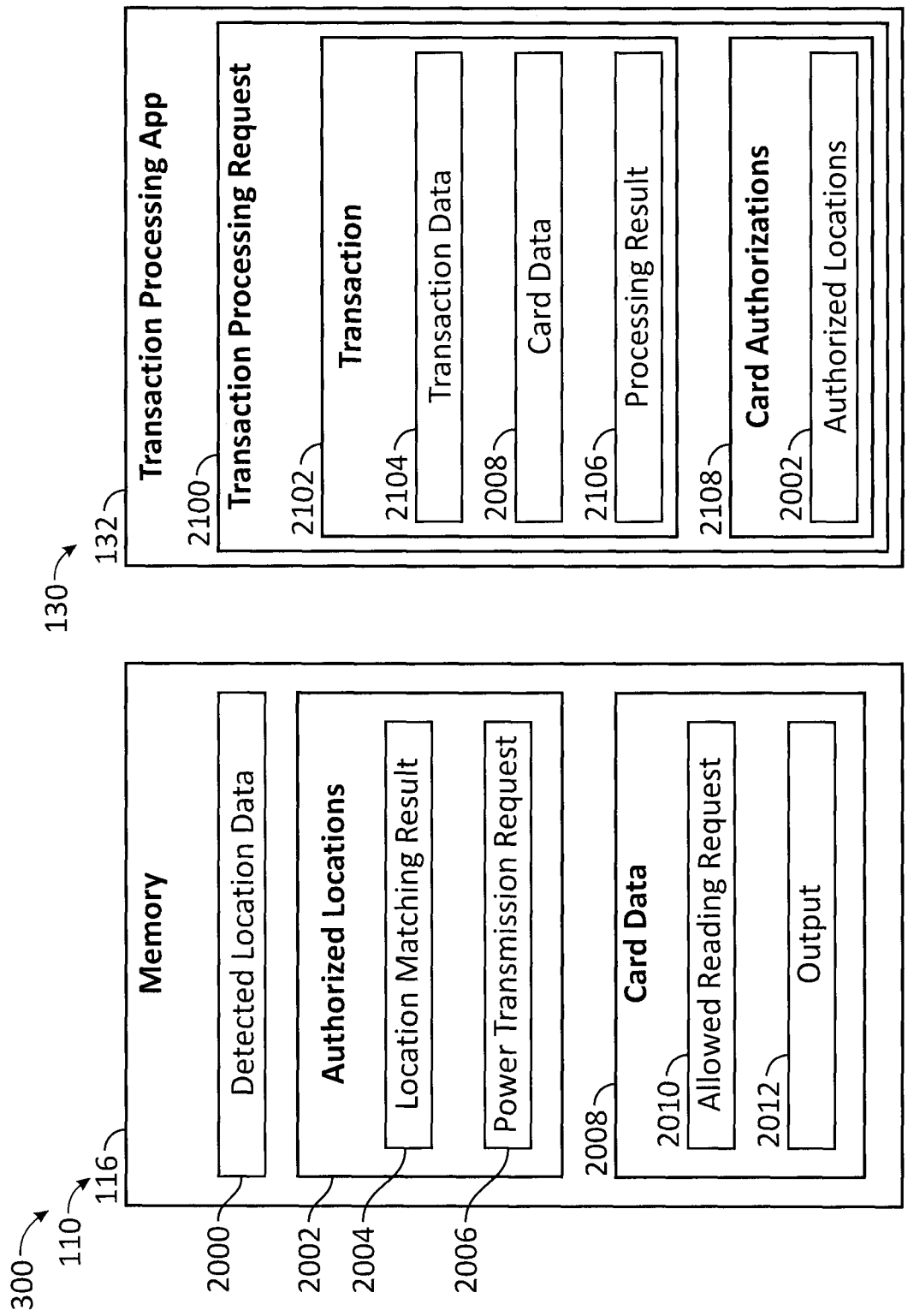
FIG. 3 is an exemplary system environment where a payment card may be read depending on authorized locations of the payment card, according to an embodiment.

FIG. 3 is an exemplary system environment where a payment card may be read only at authorized locations of the payment card, according to an embodiment. System 300 of FIG. 3 includes payment card 110 and transaction processor 130 discussed in reference to system 100 of FIG. 1.

Payment card 110 includes a memory 116 having data for use in providing stored card data based on detecting a location of payment card 110 is an authorized location where use of payment card 110 is allowed. In this regard, memory 116 includes detected location data 2000, which may correspond to location coordinates, identifiers, other location information, received identifiers, device identification data, or other information that may be specifically detected or received at a location. Using detected location data 2000 with stored authorized locations 2002 (e.g., coordinates, geo-fences, or location identifiers for authorized location and/or device identifiers, wireless broadcast identifiers, or other device identification data for authorized devices in proximity to or connected to payment card 110) to perform a location matching result 2004 by a processor. Location matching result 2004 may correspond to an authorization to release or allow card data 2008 to be read. Thus, a power transmission request 2006 may be generated for location matching result 2004 that provides power to the processor to allow reading and transmission of card data 2008. If power transmission request 2006 sends power to the processor, card data 2008 is output by the processor using a reader component of payment card 110, where allowed reading request 2010 for the processor causes an output 2012 of card data 2008.

Transaction processor 130 executes transaction processing application 132 used to process a transaction using data from payment card 110 when payment card allows the data to be read at an authorized location, where transaction processing application 132 corresponds generally to the processes discussed in reference to system 100. In this regard, transaction processing application 132 corresponds to an application that processes electronic transactions for merchant devices that request transaction processing for transactions using card data 2008. Transaction processing application 132 therefore receives a transaction processing request 2100 for a transaction 2102. Transaction 2102 includes transaction data 2104 for the transaction (e.g., items, transaction identifier, amount, receiving account, etc.). Transaction 2102 further includes card data 2008 for payment card 110 and may result in a processing result 2106 (e.g., authorization for payment or declining payment). Transaction processing application 132 further includes card authorizations 2108 for payment card 110, which includes authorized locations 2002 that may be used to generate payment card 110 and store authorized locations 2002 to payment card 110.

Figure 4:
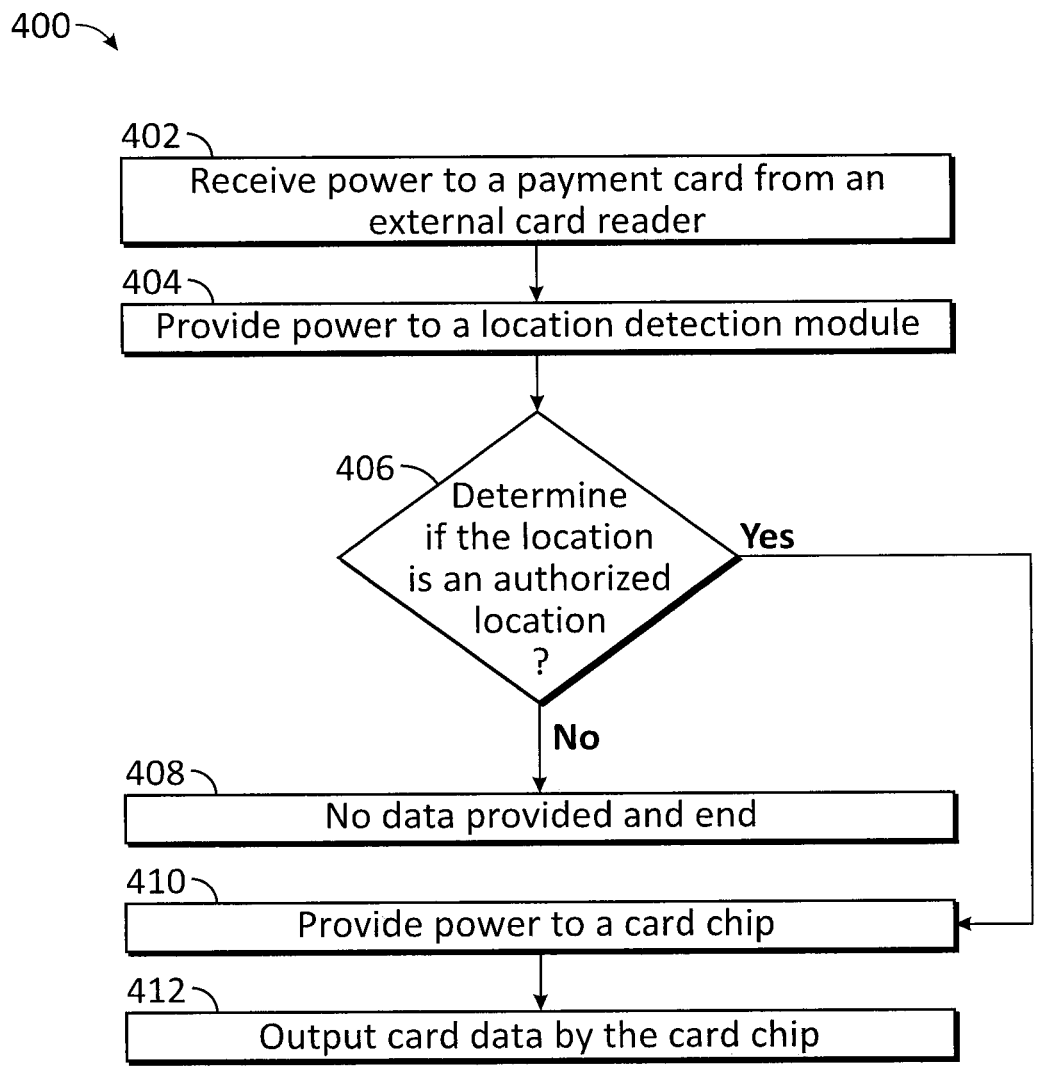
FIG. 4 is a flowchart of an exemplary process for a physical card having location detection modules for location-specific card reading, according to an embodiment.

FIG. 4 is a flowchart of an exemplary process for a physical card having one or more location detection modules for location-specific card reading, according to an embodiment. Note that one or more steps, processes, and methods described herein of flowchart 400 may be omitted, performed in a different sequence, or combined as desired or appropriate.

At step 402 of flowchart 400, power is received to a payment card from an external card reader or other external device. The power may be received by a connector or other connective component that allows for the external power source to provide power to components of the payment card. This may include using an induction coil or a direct electrical connection to power the payment card's components. A single power connection or multiple power connections may be used by the card. Once the power is received by the payment card's power connection, at step 404, the power is provided to a location detection module. Where a single power connection is used, the power is provided directly to the location detection module, which serves as a gate to providing power to a processor that outputs card data when the processor receives power. However, where multiple power connections are used, such as two connections, one connection powers the location detection module. The second power connection provides power to a separate gate, such as diode, transistor, or other logic device. This separate gate may operate as an AND switch or other logical conjunction that only outputs a binary 1 or a TRUE condition and allows power to flow if the gate receives power and/or signals to all of the input connectors (e.g., two separate input connectors, where power may flow to one connector directly and a second connector may act as a gate to allow power through when that connection receives a signal or power from the location detection module).

At step 406 of flowchart 400, the location detection module of the payment card determines the location is an authorized location. The location detection module may perform an operation to determine or receive location-specific data for the current location of the payment card, such as GPS coordinates. The location detection module may further be coupled to a memory so that the location detection module may determine if the location-specific data matches stored data for authorized locations and/or location-based data for the payment card. This authorization data therefore only allows the payment card to be read when the location-specific data matches the stored data in the memory. If the detected location-specific data does not match the stored data, then at step 408, no data is provided or output by the payment card and flowchart 400 ends. Thus, the payment card cannot be read, and no data is output. This prevents the payment card from being read at unauthorized locations and thereby assists in preventing fraud or misuse of the payment card.

However, if the location of the payment card corresponds to an authorized location for use of the payment card, then at step 410, power is provided to the processor. As previously discussed, in the embodiment with a single power connection, the power is provided by the location detection module to the processor directly, such as if the location detection module serves as a power gate to the processor to allow power through when the location of the payment card is an authorized location. However, where two or more power connections are used, a signal or power from the location detection component may be transmitted to the separate gate, such as the diode, transistor, or other logic switch, so that the gate allows power to flow to the processor from the other power connection.

Thereafter, at step 412, the card data is read by the processor. For example, when the processor is powered, an operation may be executed to read a memrory of the payment card. The memory may correspond to a non-transitory physical memory that includes the card data, such as payment information, payment card data, authorization or authentication information, and/or access data to allow access to a specific area. The memory may be the same or different from the memory storing the authorized location-based data. Once the card data is read by the processor, the processor outputs the card data, at step 414. Outputting the card data may include making the card data available through a card component that can be read (e.g., an EMV chip, programmable magnetic stripe, etc.) or outputting the card data through another connector or transmission component (e.g., a port, transmitter, or the like).

Figure 5:
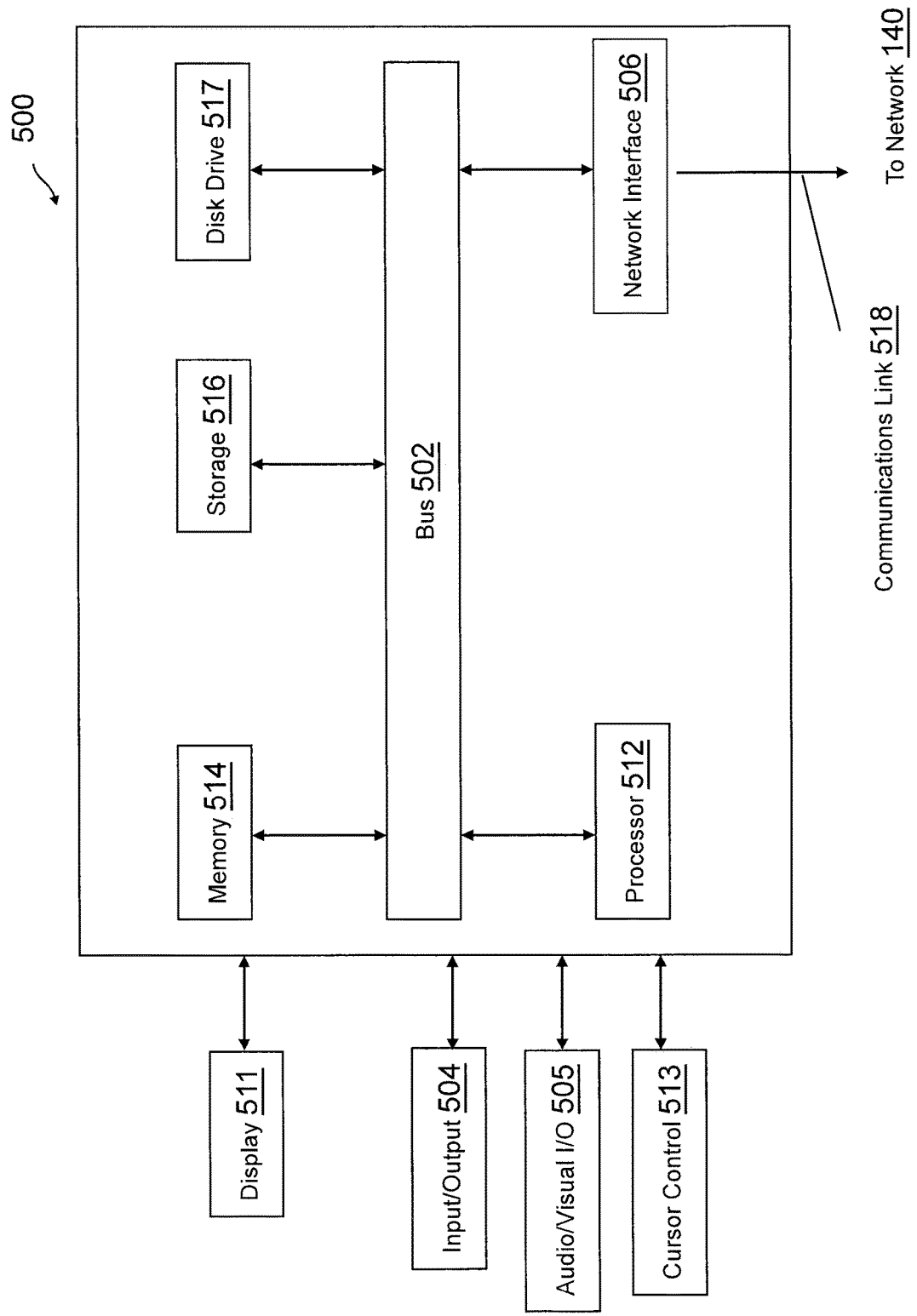
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A physical card comprising:
   at least two power connections configured to receive power from a power supply via at least one power conducting point on the physical card;
   a card chip comprising payment card data, wherein the card chip is configured to provide the payment card data to an external card reader in response to receiving the power through the at least two power connections;
   a gate for the at least two power connections and configured to provide the power to the card chip in response to receiving the power and a signal from the at least two power connections; and
   a location detection chip configured to provide the signal through one of the at least two power connections to the gate in response to detecting that a location of the physical card is an authorized location.

2. The physical card of claim 1, wherein the location detection chip comprises a global position satellite (GPS) chip having location detection component that detects locations of the physical card when receiving power from the one of the at least two power connections, and wherein the location detection chip further comprises a microprocessor or logic device that determines whether the location is the authorized location.

3. The physical card of claim 2, wherein the GPS chip comprises a passive module without a separate power supply for the GPS chip.

4. The physical card of claim 3, wherein the authorized location comprises a geofenced area associated with a set of GPS coordinates for the geofenced area, and wherein the detected location comprises detected GPS coordinates within the set of GPS coordinates.

5. The physical card of claim 4, further comprising a memory that stores the set of GPS coordinates authorized for transaction processing using the payment card data for the physical card.

6. The physical card of claim 1, wherein the at least two power connections comprise one of induction power connections or direct electrical power connections.

7. The physical card of claim 1, wherein the gate comprises one of a transistor or a diode for a logic gate, and wherein the logic gate comprises an AND switch function.

8. The physical card of claim 1, wherein the card chip comprises one of an EMV chip or a microprocessor and a card memory for a programmable magnetic stripe or an RFID antenna.

9. The physical card of claim 1, wherein the location detection chip comprises a communication module configured to connect to a transmitter and receive a signal from the transmitter, wherein the communication module is further configured to detect the authorized location based on the signal.

10. The physical card of claim 9, wherein the communication module comprises one of an RFID transceiver, a Bluetooth transceiver, or a Bluetooth Low Energy transceiver, and wherein the communication module comprises a passive antenna configured to receive the signal.

11. The physical card of claim 9, wherein the communication module comprises a memory storing at least one identifier for an authorized external transmitter for the authorized location, and wherein the signal comprises the at least one identifier.

12. A device comprising:
   a first power component that receives power from a power supply;
   a second power component that receives the power from the power supply;
   a location detection module connected to the first power component, wherein the location detection module comprises a memory storing an authorized location for the device;
   a gate connected to the location detection module and the second power component, wherein the gate receives a signal from the location detection module based on the location detection module detecting the authorized location for the device when the location detection module receives the power from the first power component, wherein the gate further receives the power directly from the second power component when the second power component receives the power; and
   a card chip connected to the gate, wherein the card chip provides data for the device in response to receiving the power from the gate,
   wherein the gate provides the power to the card chip in response to receiving the signal from the location detection module.

13. The device of claim 12, wherein the card chip comprises a logic device and a card memory storing the data, wherein the device further comprises an output component for the data, and wherein the data comprises financial data.

14. The device of claim 12, the card chip comprises an EMV chip to transmit the data to an EMV card reader in response to receiving the power.

15. The device of claim 12, wherein the authorized location comprises coordinates set with the location detection module for use of the data during transaction processing, and wherein the location detection module performs matching of coordinates detected from the location detection module to the coordinates in the memory.

16. The device of claim 15, wherein the location detection module comprises a passive module that activates and performs the matching in response to receiving the power.

17. A method comprising:
   receiving, by a power connector of a payment card, power from an external power supply, wherein the power connector is connected to a card chip and a global position satellite (GPS) module;
   providing the power from the power connector to a gate electrically coupled to the GPS module;
   detecting a location of the payment card using the GPS module;
   determining that the location comprises an authorized location of the payment card for electronic transaction processing;
   providing the power from the power connector to the card chip; and
   providing payment card data from the card chip to an external card reader.

18. The method of claim 17, wherein the payment card includes a memory comprising GPS coordinates of the authorized location.

19. The method of claim 17, wherein the power connector comprise induction coils configured to receive the power from the external power supply.

20. The method of claim 17, wherein the gate comprises one of a transistor or a diode having an AND logic gate.

* * * * *

UNITED STATES PATENT AND TRADEMARK OFFICE
CERTIFICATE OF CORRECTION

| | | |
|---|---|---|
| PATENT NO. | : 11,100,493 B2 | Page 1 of 1 |
| APPLICATION NO. | : 16/714648 | |
| DATED | : August 24, 2021 | |
| INVENTOR(S) | : Ravi Raj Singh | |

It is certified that error appears in the above-identified patent and that said Letters Patent is hereby corrected as shown below:

In the Specification

In Column 13, Line 10, change "mermory" to --memory--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*